United States Patent
Huang et al.

(10) Patent No.: US 12,175,255 B2
(45) Date of Patent: Dec. 24, 2024

(54) SELECTIVE SWITCHING OF AN ACTIVE PARTITION IN AN ELECTRONIC DEVICE

(71) Applicant: Ruckus IP Holdings LLC, Claremont, NC (US)

(72) Inventors: Wenfeng Huang, Sunnyvale, CA (US); Roland Chew, Sunnyvale, CA (US); Wen Huang, Sunnyvale, CA (US); Wei Wu, Sunnyvale, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 8 days.

(21) Appl. No.: 17/491,569

(22) Filed: Oct. 1, 2021

(65) Prior Publication Data

US 2022/0113982 A1   Apr. 14, 2022

Related U.S. Application Data

(60) Provisional application No. 63/089,564, filed on Oct. 9, 2020.

(51) Int. Cl.
| | | |
|---|---|---|
| *G06F 9/4401* | (2018.01) | |
| *G06F 1/24* | (2006.01) | |
| *G06F 1/3203* | (2019.01) | |
| *G06F 11/14* | (2006.01) | |

(52) U.S. Cl.
CPC .............. *G06F 9/4406* (2013.01); *G06F 1/24* (2013.01); *G06F 1/3203* (2013.01)

(58) Field of Classification Search
CPC ......... G06F 9/4406; G06F 1/24; G06F 1/3203
See application file for complete search history.

(56) References Cited

U.S. PATENT DOCUMENTS

| | | | |
|---|---|---|---|
| 8,826,080 B2* | 9/2014 | Righi | G06F 11/1417 714/36 |
| 10,170,908 B1* | 1/2019 | Catalano | H02J 7/0068 |
| 2004/0153724 A1 | 8/2004 | Nicholson et al. | |
| 2005/0216722 A1* | 9/2005 | Kim | G06F 9/441 713/2 |
| 2008/0092145 A1* | 4/2008 | Sun | G06F 9/45558 719/312 |
| 2009/0217024 A1 | 8/2009 | Childs et al. | |

(Continued)

OTHER PUBLICATIONS

"Extended European Search Report for European Application No. 21201646.3, dated Feb. 10, 2022021, 7 pages".

*Primary Examiner* — Jaweed A Abbaszadeh
*Assistant Examiner* — Gayathri Sampath
(74) *Attorney, Agent, or Firm* — Steven Stupp

(57) ABSTRACT

An electronic device (such as an access point) that selectively changes to an alternative or different partition is described. During operation, when the electronic device is in a first power state (such as a lower power state), an integrated circuit in the electronic device may detect or receive an error state or a change instruction. In response, the integrated circuit may change an active partition in the electronic device from a first partition to a second partition. Next, the integrated circuit may transition the electronic device to a second power state (such as a higher power state). Furthermore, a processor in the electronic device (which may be the same as or different from the integrated circuit) may install and execute an operating system of the electronic device in the second partition.

20 Claims, 4 Drawing Sheets

(56) References Cited

U.S. PATENT DOCUMENTS

| | | | |
|---|---|---|---|
| 2010/0141389 A1* | 6/2010 | Hagl | H04W 52/028 |
| | | | 340/10.1 |
| 2012/0180126 A1* | 7/2012 | Liu | G06F 21/81 |
| | | | 726/22 |
| 2015/0378746 A1 | 12/2015 | Friedman et al. | |
| 2016/0179554 A1* | 6/2016 | Khosravi | H04L 63/102 |
| | | | 726/1 |
| 2018/0124704 A1* | 5/2018 | Jung | H04W 52/0229 |
| 2018/0173877 A1* | 6/2018 | Guri | G06F 1/28 |
| 2019/0005245 A1* | 1/2019 | Laffey | G06F 3/0632 |
| 2019/0294490 A1* | 9/2019 | Zhang | G06F 11/1441 |

\* cited by examiner

SELECTIVE SWITCHING OF AN ACTIVE PARTITION IN AN ELECTRONIC DEVICE

CROSS REFERENCE TO RELATED APPLICATIONS

This application claims priority under 35 U.S.C. 119(e) to U.S. Provisional Application Ser. No. 63/089,564, "Selective Switching of an Active Partition in an Electronic Device," filed on Oct. 9, 2020, by Wenfeng Huang, et al., the contents of which are herein incorporated by reference.

FIELD

The described embodiments relate to techniques for selectively booting an electronic device using an alternative or different partition with system images.

BACKGROUND

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard. For example, a wireless network may include an access point that communicates wirelessly with one or more associated electronic devices (which are sometimes referred to as 'clients').

After deployment or installation, it is sometimes necessary to reboot an electronic device (such as an access point) using a bootloader and then to install and execute an active system image or state. For example, the system image may be loaded from flash memory into DRAM to be run by the bootloader.

However, in abnormal circumstances, the electronic device may not be able to boot up and run the system image from the active partition. For example, software in the electronic device may be broken or the system image may be corrupted. Moreover, the electronic device may be in a state where a command line interface (CLI), a shell or a console port is unavailable, so a user may not be able to easily interact with the electronic device. Consequently, in these circumstances, it may be difficult for a user to reboot the electronic device and to install and run the system image in the active partition, or to perform a remedial action to recover the electronic device back into an operating state or configuration.

SUMMARY

An electronic device (such as an access point) that selectively changes to an alternative or different partition is described. This electronic device may include: memory that includes a bootloader, a first partition with a first system image, and a second partition with a second system image; an integrated circuit. During operation, when the electronic device is in a first power state (such as a lower power state), the integrated circuit may detect or receive an error state or a change instruction, in response, the integrated circuit may change an active partition in the electronic device from the first partition to the second partition. Next, the integrated circuit may transition the electronic device to a second power state (such as a higher power state).

Note that the integrated circuit may be different from a processor in the electronic device. Alternatively, the integrated circuit may be the processor in the electronic device.

Moreover, changing the active partition in the electronic device may not change a configuration of the electronic device.

Furthermore, the processor in the electronic device may run the bootloader, and the bootloader may perform the operations of detecting or receiving the error state or the change instruction; changing the active partition; and transitioning to the second power state. Moreover, the processor may subsequently install and run an operating system of the electronic device in the second partition after running the bootloader. Thus, the operations of detecting or receiving the error state of the change instruction, changing the active partition, and transitioning to the second power state may occur before the operating system is installed and executed by the processor.

Note that the first system image may be different from the second system image. Alternatively, the first system image and the second system image may be the same.

Moreover, detecting or receiving the error state or the change instruction may include detecting activation of a physical button or switch in the electronic device for at least a predefined time interval. For example, activation of the physical button or switch may include pressing and holding of the physical button or switch for at least the predefined time interval (such as 5 s), and then releasing the physical button or switch. Note that the physical button or switch may include a power button or a reset button of the electronic device.

Furthermore, detecting or receiving the error state or the change instruction may include detecting two or more boot failures of the electronic device (such as two or more consecutive boot failures).

Additionally, detecting or receiving the error state or the change instruction may include detecting a software configuration or that the first system image is corrupted.

In some embodiments, detecting or receiving the error state or the change instruction may include receiving the change instruction associated with a second electronic device (such as a Power over Ethernet or PoE switch). For example, the change instruction may include receiving a predefined number of messages or signals associated with the second electronic device in a first time interval (such as 10-20 s) or receiving a pattern of messages or signals associated with the second electronic device in the first time interval.

Note that after the operating system is installed and run or executed by the processor, the processor may perform a factory reset of the electronic device to a default state or configuration. For example, the processor may perform the factory reset if the operating system is installed and run or executed a predefined number of times in a second time interval. In some embodiments, the factory reset may restore firmware or the operating system in the electronic device to a factory-fresh version and a configuration of the electronic device to a factory-fresh state, and/or may erase memory in the electronic device.

Another embodiment provides the integrated circuit.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
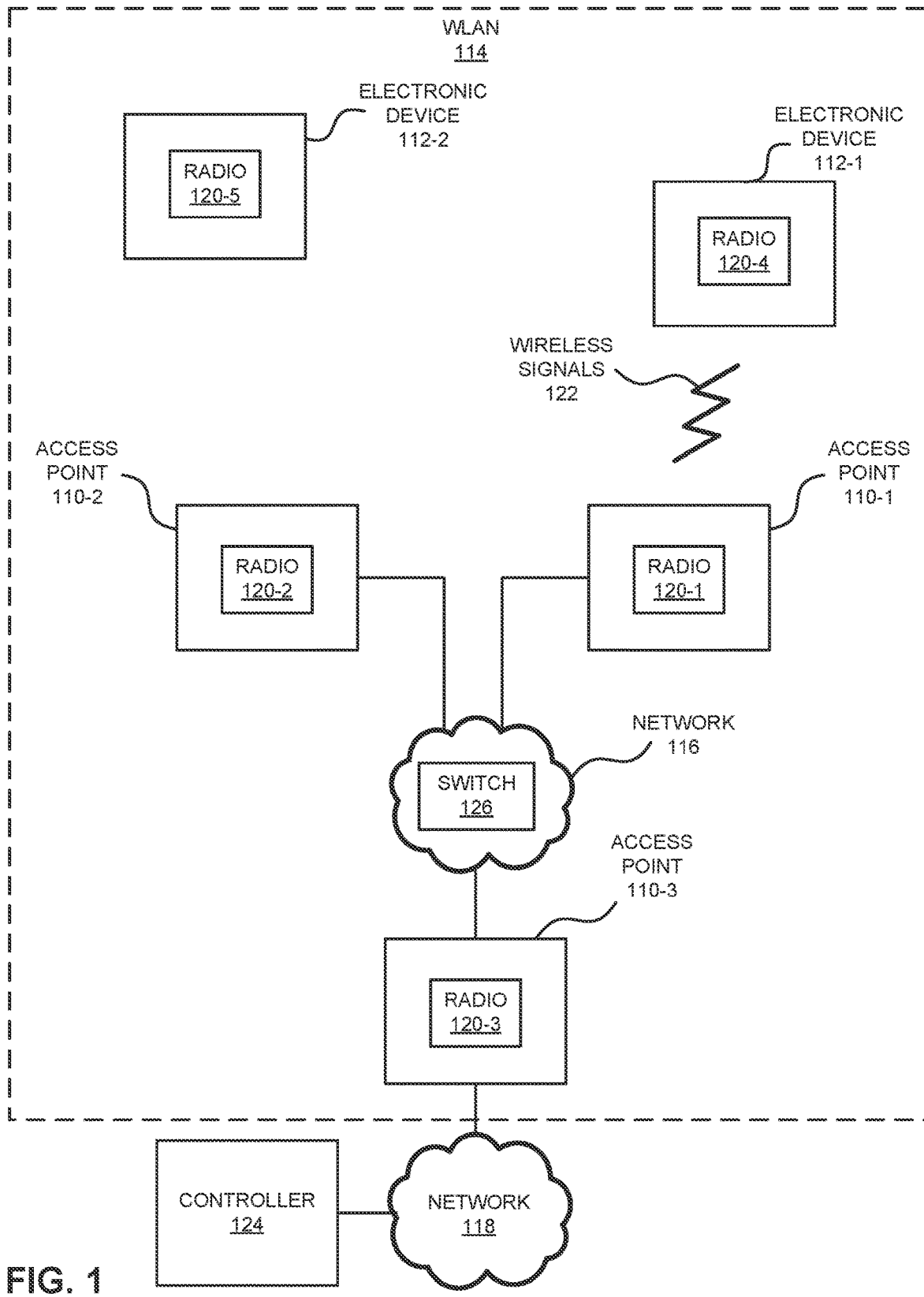
FIG. 1 is a block diagram illustrating an example of a system in accordance with an embodiment of the present disclosure.

An electronic device (such as an access point) that selectively changes to an alternative or different partition is described. During operation, when the electronic device is in a first power state (such as a lower power state), an integrated circuit in the electronic device may detect or receive an error state or a change instruction. For example, detecting or receiving the error state of the change instruction may include: detecting activation of a physical button or switch in the electronic device for at least a predefined time interval; detecting two or more boot failures of the electronic device; detecting a software configuration or that the first system image is corrupted; and/or receiving the change instruction associated with or from a second electronic device. In response, the integrated circuit may change an active partition in the electronic device from a first partition to a second partition. Next, the integrated circuit may transition the electronic device to a second power state (such as a higher power state). Furthermore, a processor in the electronic device (which may be the same as or different from the integrated circuit) may install and execute an operating system of the electronic device in the second partition.

By selectively changing to the alternative or the different partition, these partition-management techniques may allow the electronic device to be restored to an operating state or configuration. For example, the electronic device may be recovered even when the first partition is corrupted and the electronic device is unable to execute a system image in the first partition. Moreover, the partition-management techniques may be used to recover the electronic device even when the electronic device is in a state where a CLI, a shell or a console port (and, more generally, access via a serial port hardware interface) is unavailable. Consequently, the partition-management techniques may simplify and reduce the effort needed to reboot the electronic device. Therefore, the partition-management techniques may facilitate ease of use of the electronic device and may improve the overall user experience.

In the discussion that follows, an electronic device and an access point may communicate packets or frames in accordance with a wireless communication protocol, such as an Institute of Electrical and Electronics Engineers (IEEE) 802.11 standard (which is sometimes referred to as from the Wi-Fi Alliance of Austin, Texas), Bluetooth (from the Bluetooth Special Interest Group of Kirkland, Washington), and/or another type of wireless interface. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. In the discussion that follows, Wi-Fi is used as an illustrative example. However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi'). In some embodiments, communication between electronic devices may use multi-user transmission (such as orthogonal frequency division multiple access or OFDMA).

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among one or more access points 110 and electronic devices 112 (such as a cellular telephone, and which are sometimes referred to as 'stations' or 'clients') in a WLAN 114 in accordance with some embodiments. Notably, access points 110 may communicate with each other in WLAN 114 using wireless and/or wired communication. Moreover, access points 110 may be configured and managed via one or more controllers, such as controller 124 (e.g., a cloud-based controller that configures and manages access points 110). Furthermore, at least one of access points 110 (such as access point 110-3) may provide access to a network 118 (such as the Internet, a cable network, a cellular-telephone network, etc.) that is external to WLAN 114. For example, access points 110 may communicate with controller 124 via network 118. While controller 124 is illustrated as being external to WLAN 114 in FIG. 1, in some embodiments controller 124 is implemented within WLAN 114. Moreover, at least some of access points 110 (such as access point 110-1 and access point 110-2) may communicate with electronic devices 112 using wireless communication. Note that access points 110 may include a physical access point and/or a virtual access point that is implemented in software in an environment of an electronic device or a computer.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches, such as switch 126. Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique.

Figure 4:
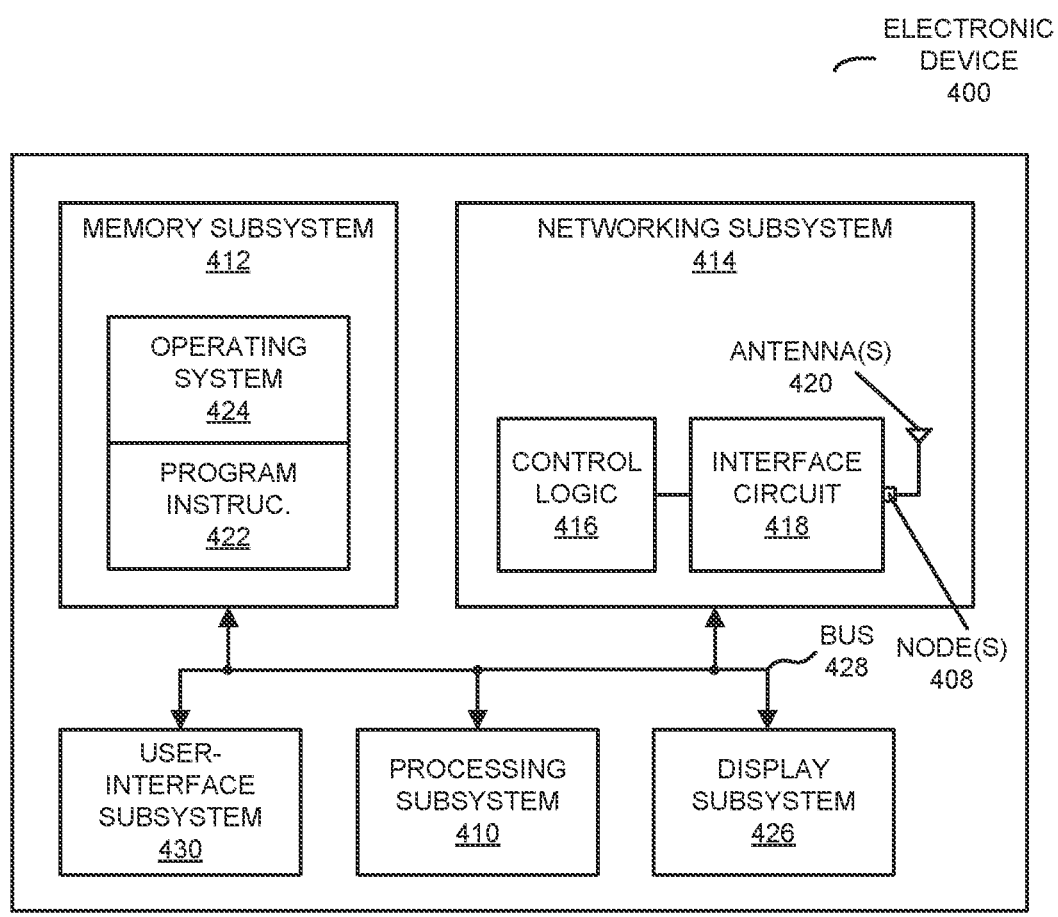
FIG. 4 is a block diagram illustrating an electronic device in accordance with an embodiment of the present disclosure.

As described further below with reference to FIG. 4, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-1 in access point 110-1. These wireless signals may be received by radio 120-4 in electronic device 112-1. Notably, access point 110-1 may transmit packets. In turn, these packets may be received by electronic device 112-1. Moreover, access point 110-1 may allow electronic device 112-1 to communicate with other electronic devices, computers and/or servers via networks 116 and/or 118.

Note that the communication among access points 110 and/or with electronic devices 112 may be characterized by a variety of performance metrics (which are sometimes referred to as 'communication performance metrics'), such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or a frame in access points 110 and electronic devices 112 includes: receiving signals (such as wireless signals 122) with the packet or the frame; decoding/extracting the packet or the frame from received wireless signals 122 to acquire the packet or the frame; and processing the packet or the frame to determine information contained in the packet or the frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, sometimes it can be difficult to: reboot, install and run a system image in an active partition, and/or restore one of access points 110 (such as access point 110-1) to an operating state or configuration. For example, software in access point 110-1 may be broken or a system image in a partition in memory may be corrupted. Moreover, access point 110-1 may be in a state where a CLI, a shell or a console port is unavailable, so a user may not be able to easily interact with access point 110-1.

Figure 2:
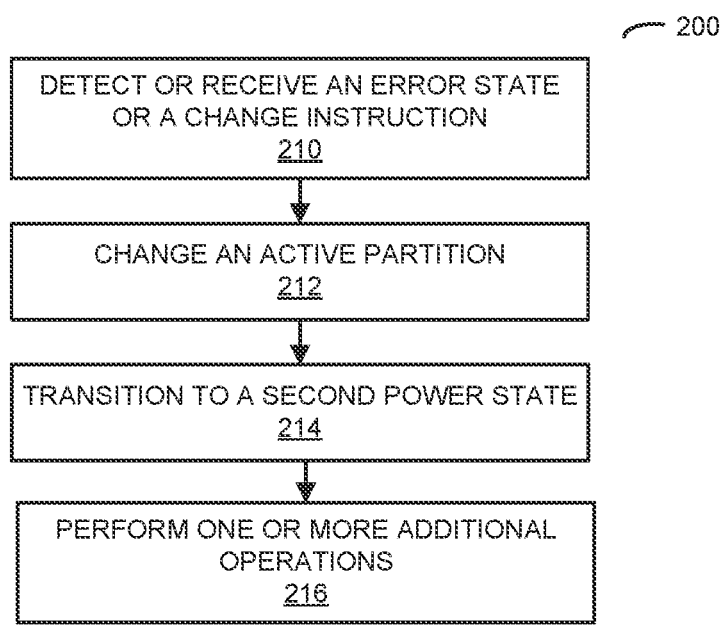
FIG. 2 is a flow diagram illustrating an example method for selectively changing to an alternative or different partition in an electronic device in the system of FIG. 1 in accordance with an embodiment of the present disclosure.

As described further below with reference to FIGS. 2-3, in order to address this problem, the partition-management techniques may allow a user (such as a network administrator) to change or switch an active partition for access point 110-1 from a first partition in memory that stores a first system image to a second partition in memory that stores a second system image. Note that the first system image may different from the second system image. For example, the first system image may be a different instance or version than the second system image. Alternatively, the first system image and the second system image may be the same. Note that a given system image may include an instance or a version of software, firmware, an operating system and/or a configuration of access point 110-1.

Notably, when access point 110-1 is in a first power state (such as a lower power state, e.g., a power off state), an integrated circuit (which may be a processor or may be a different component) in access point 110-1 may detect or receive an error state or a change instruction. In response, the integrated circuit may change an active partition in access point 110-1 from the first partition to the second partition. Next, the integrated circuit may transition access point 110-1 to a second power state (such as a higher power state, e.g., a power on state).

In some embodiments, the integrated circuit is a processor. The processor in access point 110-1 may run a bootloader, and the bootloader may perform the operations of: detecting or receiving the error state or the change instruction; changing the active partition; and transitioning to the second power state. Moreover, the processor may subsequently install and run an operating system of the electronic device in the second partition after running the bootloader. Thus, the operations of detecting or receiving the error state of the change instruction, changing the active partition, and transitioning to the second power state may occur before the operating system is installed and executed by the processor.

Moreover, detecting or receiving the error state or the change instruction may include detecting activation of a physical button or switch (and, more generally, a user-interface device) in access point 110-1 for at least a predefined time interval. For example, activation of the physical button or switch may include pressing and holding of the physical button or switch for at least the predefined time interval (such as 1-10 s, e.g., 5 s), and then releasing the physical button or switch. Note that the physical button or switch may include a power button or a reset button of access point 110-1. Furthermore, detecting or receiving the error state or the change instruction may include detecting two or more boot failures of access point 110-1 (such as two or more consecutive boot failures, e.g., five boot failures). Additionally, detecting or receiving the error state or the change instruction may include detecting a software configuration of access point 110-1 or that the first system image is corrupted.

While the preceding embodiments illustrated changing the active partition using access point 110-1, in other embodiments switch 126 may change the active partition. As discussed in more detail below, detecting or receiving the error state or the change instruction may include receiving the change instruction associated with a second electronic device (such as switch 126). For example, the change instruction may include receiving a predefined number of messages or signals associated with the second electronic device in a predefined time interval (such as 1-20 s) or receiving a pattern of messages or signals associated with switch 126 in the predefined time interval.

Note that after the operating system is installed and run or executed by the processor, the processor may optionally perform a factory reset of access point 110-1 to a default state or configuration. For example, the processor may perform the factory reset if the operating system is installed and run or executed a predefined number of times in a time interval. Thus, the processor may perform the factory reset of access point 110-1 when the operating system is repeatedly being loaded and executed, which may indicate that a failure is occurring. In some embodiments, the factory reset may restore firmware or the operating system in access point 110-1 to a factory-fresh version and a configuration of access point 110-1 to a factory-fresh state, and/or may erase memory in access point 110-1.

In these ways, the partition-management techniques may allow the active partition in one of access points to be selectively changed. This capability may allow one of access points 110 to be restored to an operating state or configuration. Consequently, the partition-management techniques may facilitate ease of use of access points 110 and may improve the overall user experience.

We now describe embodiments of the method. FIG. 2 presents a flow diagram illustrating an example of a method 200 for selectively changing to an alternative or different partition in an electronic device, such as access point 110-1 in FIG. 1.

During operation, when the electronic device is in a first power state (such as a lower power state), the electronic device may detect or receive an error state or a change instruction (operation 210). For example, detecting or receiving the error state or the change instruction may include detecting activation of a physical button or switch in the electronic device for at least a predefined time interval. In some embodiments, activation of the physical button or switch may include pressing and holding of the physical button or switch for at least the predefined time interval (such as 5 s), and then releasing the physical button or switch. Note that the physical button or switch may include a power button or a reset button of the electronic device. Alternatively or additionally, detecting or receiving the error state or the change instruction may include: detecting two or more boot failures of the electronic device (such as two or more consecutive boot failures); detecting a software configuration or that the first system image is corrupted; and/or receiving the change instruction associated with a second electronic device (such as a PoE switch). For example, the change instruction may include receiving a predefined number of messages or signals associated with the second electronic device in a first time interval (such as 10-20 s) or receiving a pattern of messages or signals associated with the second electronic device in the first time interval.

In response, the electronic device may change an active partition (operation 212) in the electronic device from a first partition with a first system image to a second partition with a second system image. Note that changing the active partition in the electronic device may not change a configuration of the electronic device. Moreover, the first system image may be different from the second system image. Alternatively, the first system image and the second system image may be the same.

Next, the electronic device may transition the electronic device to a second power state (operation 214), such as a higher power state.

In some embodiments, a processor (or a microcontroller) in the electronic device may run a bootloader, and the bootloader may perform operations 210, 212 and 214. Moreover, the processor may subsequently install and run an operating system of the electronic device in the second partition after running the bootloader. Thus, operations 210, 212 and 214 may occur before the operating system is installed and executed by the processor.

Moreover, in some embodiments the electronic device may optionally perform one or more additional operations (operation 216). Notably, after the operating system is installed and run or executed by the processor, the processor may optionally perform a factory reset of the electronic device to a default state or configuration. For example, the processor may perform the factory reset if the operating system is installed and run or executed a predefined number of times in a second time interval (such as 1-20 min, e.g., several minutes), which may include that the operating system and/or a configuration of the electronic device is corrupted. In some embodiments, the factory reset may restore firmware or the operating system in the electronic device to a factory-fresh version and a configuration of the electronic device to a factory-fresh state, and/or may erase memory in the electronic device.

In some embodiments of method 200, there may be additional or fewer operations. Furthermore, the order of the operations may be changed, and/or two or more operations may be combined into a single operation.

Figure 3:
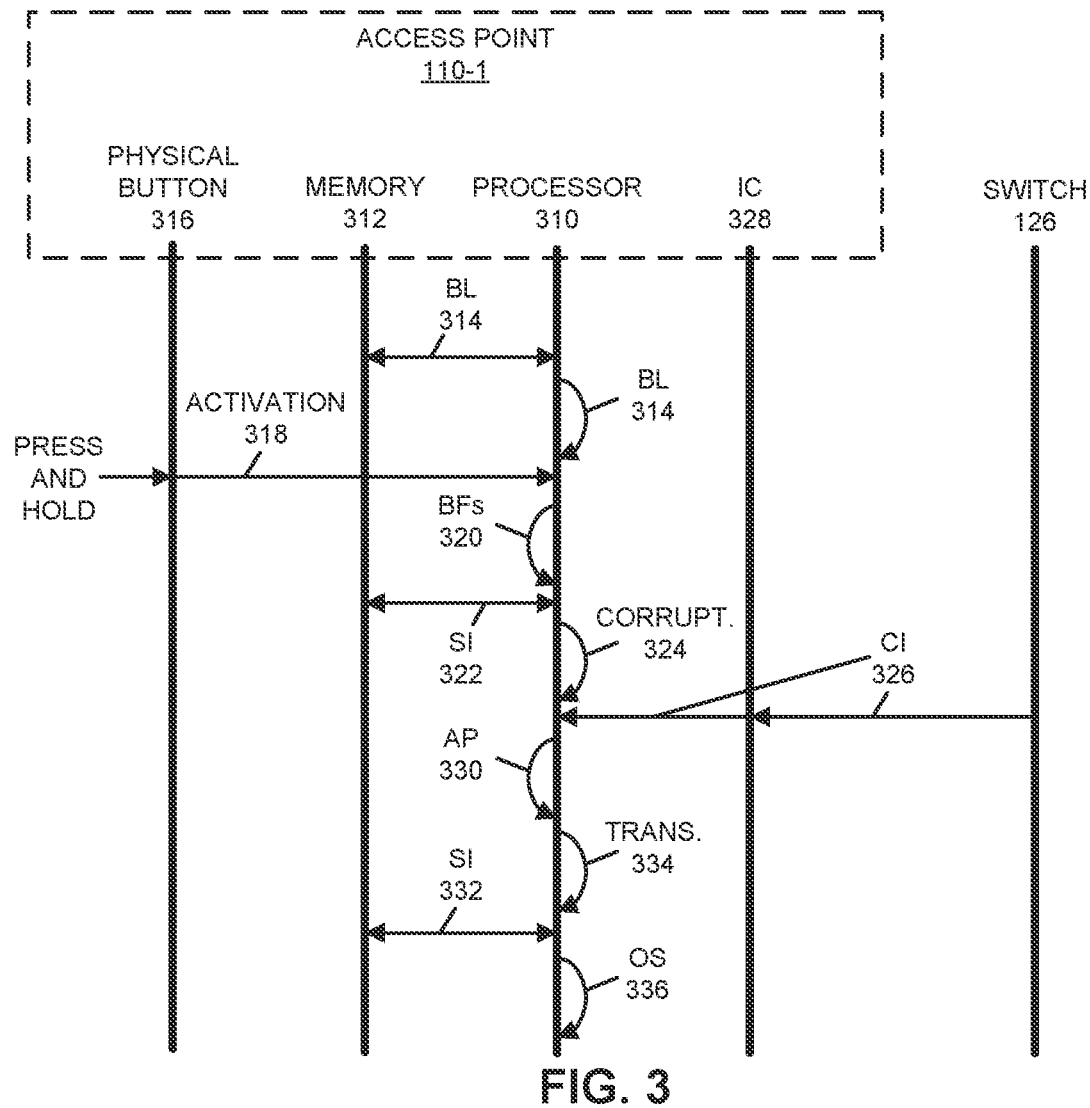
FIG. 3 is a drawing illustrating an example of communication among electronic devices in FIG. 1 in accordance with an embodiment of the present disclosure.

FIG. 3 presents a drawing illustrating an example of communication among components in access point 110-1 and/or with switch 126. During operation, processor 310 in access point 110-1 may access bootloader (BL) 314 in memory 312 in access point 110-1. Then, processor 310 may execute bootloader 314, while access point 110-1 is in a lower power state.

Moreover, processor 310 may detect an activation 318 signal from a physical button 316 in access point 110-1 for at least a predefined time interval (such as 3-5 s). Alternatively or additionally, processor 310 may detect two or more boot failures (BFs) 320 of access point 110-1 (such as two or more consecutive boot failures); detecting a software configuration or that system image (SI) 322 in memory 312 is corrupted 324, and/or receiving, via interface circuit (IC) 328 in access point 110-1, a change instruction (CI) 326 from switch 126. For example, the change instruction 326 may include receiving a predefined number of messages or signals (such as power signals) from switch 126 in a first time interval (such as 10-20 s) or receiving a pattern of messages or signals from switch 126 in the first time interval.

In response to detecting activation 318, detecting the two or more boot failures 320, detecting corruption 324 of system image 322, and/or receiving the change instruction 326, processor 310 may change an active partition (AP) 330 in access point from a first partition in memory 312 that includes system image 322 to a second partition in memory 312 that includes system image 332.

Next, processor 310 may transition 334 access point 110-1 to a second power state, such as a higher power state. Moreover, processor 310 may access system image 332 in memory 312, and may install and run an operating system (OS) 336 that is included in system image 332.

While FIG. 3 illustrates communication between components using unidirectional or bidirectional communication with lines having single arrows or double arrows, in general the communication in a given operation in this figure may involve unidirectional or bidirectional communication.

We now describe additional embodiments of the partition-management techniques. Referring back to FIG. 1, an access point (such as access point 110-1) may include a network interface that provides connectivity to and communications with a Wi-Fi network or a WLAN. Moreover, the network interface may include a connector, such as, an Ethernet connector for receiving an Ethernet cable. Furthermore, the network interface may receive power for access point 110-1, e.g., via a switch 126, to which access point 110-1 is connected. This switch may include a PoE switch and the network interface may include a PoE network interface, so that power can also be provided to access point 110-1 over an Ethernet cable. However, in other embodiments, access point 110-1 may not receive power via the network interface. Instead, access point 110-1 may include a power interface snot shown) that receives power from a power source via a power cable.

Additionally, access point 110-1 may include a processor that executes program instructions to enable access point 110-1 to receive and process PoE signaling from a PoE power source (e.g., switch 126). The PoE signaling may, e.g., indicate the presence of access point 110-1 and negotiate an amount of available and/or required power for access point 110-1. As discussed further below, the PoE signaling may be expanded to convey additional information.

As discussed previously, access point 110-1 may get into a state where it is not fully functioning and potentially not operationally functioning at all (e.g., program instructions associated with operation of access point 110-1 are either not being executed by the processor or when executed by the processor are not causing the processor to operate correctly) for a variety of reasons. When this occurs, the active partition in access point 110-1 may need to be changed and/or the program instructions (such as firmware or an operating system in a system image in the active partition) may need to be re-installed and executed. Moreover, when access point 110-1 is in this state, remote network access via any of the typical options (e.g., a network controller, a network administrator, another electronic device, etc.) may not be available. Furthermore, when access point 110-1 is in this state it may not be capable of performing certain functions, including communicating with the Wi-Fi network and/or one or more other electronic devices (e.g., routing information between the electronic devices connected to access point 110-1 and the Wi-Fi network). An external indication that access point 110-1 can process in this state may be needed in order to change the active partition. This external indication may need to be capable of being acted on by an integrated circuit and/or the processor when access point 110-1 is in this state (and, thus, may not need functional program instructions stored in memory to cause the processor to control the functional operations of access point 110-1 when executed).

In some embodiments, the external indication may be received from a PoE power source (e.g., a PoE network switch, such as switch 126) that provides PoE to access point 110-1. The external indication may include expanded PoE signaling that directs access point 110-1 to perform one or more operations on itself (e.g., changing the active partition, rebooting, installing and running firmware and/or an operating system, and/or performing a factory reset). Switch 126 may send the expanded PoE signaling to access point 110-1, and access point 110-1 may be able to recognize and process the PoE signaling while it is in a state requiring a change to the active partition and/or performing of at least one of the one or more other operations. Thus, the integrated circuit and/or the processor may be able to execute program instructions stored in the memory associated with PoE and the operation of access point 110-1 even if the functional program instructions are not operating correctly.

Moreover, access point 110-1 may initiate the change to the active partition and/or perform at least one of the one or more other operations (which may the same as if a reset button hidden in a hole in a housing of access point 110-1 was depressed with, e.g., a paper clip) based at least in part on the PoE signaling. The use of PoE signaling may enable remote changing of the active partition in access point 110-1 and/or performing at least one of the one or more other operations by access point 110-1 when these changes or operations are needed, such as when access point 110-1 is not operationally functioning correctly and/or when remote network access to access point 110-1 is not available.

For example, switch 126 may be remotely accessed (or programmed, such as via a user interface) in order to have the appropriate signaling generated and sent or transmitted to access point 110-1. Note that the PoE signaling may include: standard signals, vendor-specific manufacturer, provider, etc.) signals, or electronic-device-specific (e.g. make, model, etc.) signals. In some embodiments, the PoE signaling may include a predefined power pattern.

Moreover, access point 110-1 may be programmed with the PoE signaling stored in memory (so that access point 110-1 can recognize the PoE signaling) and the actions to be taken when the PoE signaling is received may be defined and programmed into access point 110-1 (such as changing the active partition, performing at least one of the one or more other operations, etc.). As noted previously, these actions may be performed by an integrated circuit (e.g., hardware) and/or a processor that executes program instructions.

While PoE signaling is used as an illustrative example in the preceding discussion, in other embodiments remote signaling of the change in the active partition and/or an instruction to perform at least one of the one or more operations may not use PoE signaling (whether or not switch 126 and/or access point 110-1 are capable of exchanging PoE signaling). For example, in some embodiments, an external indication for changing the active partition and/or performing at least one of the one or more operations may involve one or more unique power sequences. The one or more unique power sequences may be controlled by switch 126 and/or physically controlled. In some embodiments, switch 126 may provide remote access to turn on/off the power to access point 110-1 using, e.g., a WLAN, wireless communication (e.g., Wi-Fi), mobile communications (e.g., LTE, 5G), text communication (e.g., SMS) and/or the Internet. In response to such a remote instruction, switch 126 may turn on/off the power it supplies. However, in some embodiments, the power may be physically controlled by, e.g., removing the power cord fir access point 110-1. The embodiments may, therefore, require additional functionality and possibly additional components to detect the one or more unique power sequences. For example, access point 110-1 may include a microcontroller and/or a field-programmable gate array or FPGA (and, more generally, an integrated circuit).

The microcontroller may be able to detect changes in the power state of access point 110-1. For example, the microcontroller may detect when power is removed from access point 110-1 and/or when power is applied to access point 110-1. Moreover, the microcontroller may be able to detect the power state changes after access point 110-1 has lost power and/or prior to access point 110-1 rebooting after the power has been reapplied. In order to detect the changes in power state the loss of power), the microcontroller may require an alternative power source (such as a battery). In some embodiments, the microcontroller may include a power state register that is, e.g., set to a first value (e.g., '0') when no power (or power below a predefined voltage or amperage) is received and is set to a second value (e.g., '1') when operational power is applied. Furthermore, the microcontroller may be capable of detecting when power is applied (or is above the minimal level) and is below an operational value and set the power state register to a third value (e.g., '2'). This type of power application may not be provided by physically toggling the power, but may be provided by switch 126.

Once the microcontroller sets the power register to the second value (or the third value), the microcontroller may record the value and the associated time. For example, the time and power state value may be recorded in the FPGA, the memory or another register.

Additionally, the FPGA may store data representing a predefined power pattern corresponding to a received power pattern that will initiate the change in the active partition and/or at least one of the one or more operations. The predefined power pattern may be, e.g., a certain number of toggles in power in a certain amount of time (or a time interval, such as 5 or 10 s). According to some embodiments, the toggles may be the initiation of an operational power state (which would indicate a toggle from a non-power state). Moreover, the predefined power pattern may be a pattern that is not likely to happen as a result of power fluctuations in order to prevent inadvertent initiating of the change in the active partition and/or at least one of the one or more operations by access point 110-1. By way of example, the predefined power pattern may be a number of power cycles (e.g., three or five power cycles) within a time period such as a predefined number of seconds (e.g., within 8 or 10 s).

In some embodiments, e.g., if the received power pattern is going to be provided by switch 126, the power that is toggled may be, in one power state, at a non-zero voltage different from a voltage of operational power, or at a non-zero amperage different from an amperage of operational power (e.g., at a voltage or amperage below that of normal operational conditions), so as to generate, e.g., the third power state value described previously. The predefined power pattern may accordingly be the initiation of the below-operational power state a predefined number of times within a predefined period of time. In some embodiments, the predefined power pattern may be the toggling of power between the different power states (operational and below operational). By way of example, the predefined power pattern may be an alternating of second and third power state values four times (e.g., 1, 2, 1, 2) within 10 seconds. More generally, the predefined power pattern may include two or more power state values and/or frequencies in a predefined time interval. Thus, the predefined power pattern may include categorical and/or continuous-valued information.

An FPGA in access point 110-1 may store data representing the power states detected by the microcontroller. During or after booting of access point 110-1, the processor may compare the stored power state toggles recorded in the FPGA by the microcontroller to the predefined power pattern defined or stored in the FPGA. If the power patterns correspond (e.g., match) each other, the processor may initiate the change in the active partition and/or performing of at least one of the one or more operations by access point 110-1.

In some embodiments of the communication techniques, an access point may have two system partitions that store different versions of system images. At a given time, one of these system images may be loaded from flash memory into DRAM and run or executed by a bootloader. Under normal circumstances, the system image that is run may be selected at runtime through a CLI, a shell (such as a Linux shell) or a console port when the system is up and running. However, in abnormal circumstances (such as when the CLI, the shell or the console port are unavailable), the access point may not be able to boot up and run from the current active partition, e.g., because of corrupted software, a corrupted system image, when the access point is in a state where these access techniques may not be available, and/or because of convenience. In these embodiments, the communication techniques may be used to change the active partition. For example, when the access point is powered off, a user may press and hold a reset button. Then, when power is applied to the access point, a bootloader may detect a reset button signal, and may load the system from an alternative system-image partition. Alternatively, the access point may detect the reset button signal and may change the active partition before the access point is powered on or transitioned to a higher power state.

We now describe embodiments of an electronic device, which may perform at least some of the operations in the partition-management techniques. FIG. 4 presents a block diagram illustrating an example of an electronic device 400 in accordance with some embodiments, such as one of access points 110, electronic devices 112, controller 124, or switch 126 (such as a network power switch, a PoE switch, etc.). This electronic device includes processing subsystem 410, memory subsystem 412, and networking subsystem 414. Processing subsystem 410 includes one or more devices configured to perform computational operations. For example, processing subsystem 410 can include one or more microprocessors, ASICs, microcontrollers, programmable-logic devices (such as one or more FPGAs), one or more graphics process units (GPUs) and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program instructions 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as nodes 408, e.g., a network node that can be connected or coupled to a network, or a connector or a pad that can be coupled to the one or more antennas 420. Thus, electronic device 400 may or may not include the one or more antennas 420.) For example, networking subsystem 414 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a networking system), an Ethernet networking system, a cable modem networking system, and/or another networking system.

Note that a transmit or receive antenna pattern (or antenna radiation pattern) of electronic device 400 may be adapted or changed using pattern shapers (such as reflectors) in one or more antennas 420 (or antenna elements), which can be independently and selectively electrically coupled to ground to steer the transmit antenna pattern in different directions. Thus, if one or more antennas 420 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 400 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Furthermore, electronic device 400 may include a user-interface subsystem 430 with, e.g., lights that provide an indication about the operational status of electronic device 400. The user-interface subsystem may also include switches, buttons, etc. that allow a user to power electronic device 400 on/off and/or to change an active partition in memory subsystem 412.

Electronic device 400 can be (or can be included in) any electronic device with at least one network interlace. For example, electronic device 400 can be (or can be included in): a desktop computer, a laptop computer, a subnotebook/netbook, server, a tablet computer, a smartphone, a cellular telephone, a smartwatch, a consumer-electronic device, a portable computing device, an access point, a transceiver, a router, a switch, communication equipment, a gateway, a bridge, a repeater, an extender, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, display subsystems and/or user-interface subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program instructions 422 are included in operating system 424 and/or control logic 416 is included in interface circuit 418. In some embodiments, the partition-management techniques are implemented using information in layer 2 and/or layer 3 of the Open System Interconnection model.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414 (or, more generally, of electronic device 400). The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the partition-management techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the partition-management techniques may be implemented using program instructions 422, operating system 424 (such as a driver for interface circuit 418) or in firmware in interface circuit 418. Alternatively or additionally, at least some of the operations in the partition-management techniques may be implemented in a physical layer, such as hardware in interface circuit 418.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the partition-management techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   memory that stores: a bootloader, a first partition with a first system image, and a second partition with a second system image; and
   an integrated circuit, wherein the integrated circuit is configured to:
      when the electronic device is in a first power state, run the bootloader, wherein the bootloader is configured to:
         detect or receive an error state based at least in part on a predefined time-varying power pattern of the electronic device within a predefined time interval, wherein the predefined time-varying power pattern is different from a power pattern associated with power fluctuations, and wherein the predefined time-varying power pattern comprises toggling between different power states of the electronic device a predefined number of times within the predefined time interval, and the toggling between the different power states is in response to one or more user received inputs;
         change an active partition in the electronic device from the first partition to the second partition based at least in part on the detecting; and
         transition the electronic device to a second power state; and install and run an operating system of the electronic device in the second partition after running the bootloader.

2. The electronic device of claim 1, wherein the first power state is a lower power state and the second power state is a higher power state.

3. The electronic device of claim 1, wherein the integrated circuit is different from a processor in the electronic device.

4. The electronic device of claim 1, wherein changing the active partition in the electronic device does not change a configuration of the electronic device.

5. The electronic device of claim 1, wherein, after the operating system is installed and run a predefined number of times in a first time interval by the integrated circuit, the integrated circuit is configured to perform a factory reset of the electronic device to a default state or configuration.

6. The electronic device of claim 1, wherein the first system image is different from the second system image.

7. The electronic device of claim 1, wherein detecting or receiving the error state or a change instruction comprises detecting activation of a physical button or switch in the electronic device for at least the predefined time interval.

8. The electronic device of claim 7, wherein activation of the physical button or switch comprises pressing and holding of the physical button or switch for at least the predefined time interval.

9. The electronic device of claim 7, wherein the physical button or switch comprises a power button or a reset button of the electronic device.

10. The electronic device of claim 1, wherein detecting or receiving the error state comprises detecting two or more boot failures of the electronic device.

11. The electronic device of claim 1, wherein detecting or receiving the error state comprises detecting a software configuration or that the first system image is corrupted.

12. The electronic device of claim 1, wherein detecting or receiving the error state comprises receiving a change instruction associated with a second electronic device.

13. The electronic device of claim 12, wherein the change instruction comprises: receiving a predefined number of messages or signals associated with the second electronic device in a first time interval; or receiving a pattern of messages or signals associated with the second electronic device in the first time interval.

14. A non-transitory computer-readable storage medium for use in conjunction with an electronic device, the computer-readable storage medium storing program instructions that, when executed by the electronic device, causes the electronic device to perform operations comprising:
when the electronic device is in a first power state, running a bootloader, wherein the bootloader causes the electronic device to perform second operations comprising:
detecting or receiving an error state based at least in part on a predefined time-varying power pattern of the electronic device within a predefined time interval, wherein the predefined time-varying power pattern is different from a power pattern associated with power fluctuations, and wherein the predefined time-varying power pattern comprises toggling between different power states of the electronic device a predefined number of times within the predefined time interval, and the toggling between the different power states is in response to one or more user received inputs;
changing an active partition in the electronic device from a first partition in memory in the electronic device to a second partition in memory in the electronic device based at least in part on the detecting or the receiving of the error state; and
transitioning the electronic device to a second power state; and
installing and running an operating system of the electronic device in the second partition after running the bootloader.

15. The non-transitory computer-readable storage medium of claim 14, wherein the first power state is a lower power state and the second power state is a higher power state.

16. A method for selectively changing from a first partition to a second partition, comprising:
by an electronic device:
when the electronic device is in a first power state, running a bootloader, wherein the bootloader causes the electronic device to perform operations comprising:
detecting or receiving an error state based at least in part on a predefined time-varying power pattern of the electronic device within a predefined time interval, wherein the predefined time-varying power pattern is different from a power pattern associated with power fluctuations, and wherein the predefined time-varying power pattern comprises toggling between different power states of the electronic device a predefined number of times within the predefined time interval, and the toggling between the different power states is in response to one or more user received inputs;
changing an active partition in the electronic device from a first partition in memory in the electronic device to a second partition in memory in the electronic device based at least in part on the detecting or the receiving of the error state; and
transitioning the electronic device to a second power state; and
installing and running an operating system of the electronic device in the second partition after running the bootloader.

17. The non-transitory computer-readable storage medium of claim 14, wherein changing the active partition in the electronic device does not change a configuration of the electronic device.

18. The non-transitory computer-readable storage medium of claim 14, wherein, after the operating system is installed and run a predefined number of times in a first time interval, the operations comprise performing a factory reset of the electronic device to a default state or configuration.

19. The method of claim 16, wherein the first power state is a lower power state and the second power state is a higher power state.

20. The method of claim 16, wherein, after the operating system is installed and run a predefined number of times in a first time interval, the method comprises performing a factory reset of the electronic device to a default state or configuration.

* * * * *